: 3,646,098
BORON ACID ESTERS
Henryk A. Cyba, Evanston, Ill., assignor to Universal Oil Products Company, Des Plaines, Ill.
No Drawing. Continuation-in-part of application Ser. No. 458,786, May 25, 1965. This application Dec. 30, 1968, Ser. No. 787,990
Int. Cl. C07f 5/04
U.S. Cl. 260—462 R          5 Claims

ABSTRACT OF THE DISCLOSURE

Reaction product of polyhydroxydiphenyl alkane, ether, sulfide or amine, a borylating agent and an N,N-dihydrocarbyl-hydroxy amine, formed at a temperature of from about 60° to about 200° C. These compounds are useful as stabilizing agents for plastic, rubber, hydrocarbon distillate and other organic substrates normally subject to deterioration due to weathering, oxidation, heat, etc.

CROSS REFERENCE TO RELATED APPLICATIONS

This is a continuation-in-part of application Ser. No. 458,786, filed May 25, 1965, now Pat. No. 3,445,498, May 20, 1969.

BACKGROUND OF THE INVENTION

Parent 3,445,498 discloses the reaction products of various polyhydroxy aromatic compounds, borylating agents and N,N-dihydrocarbyl hydroxy amines as novel compositions of matter, as well as the use thereof as additives in organic substrates subject to oxidative or other deterioration. Said patent contains claims directed to the species in which the polyhydroxy aromatic compound is a mononuclear aromatic compound. The present continuation-in-part application is directed to the species in which the polyhydroxy aromatic compound is a polynuclear aromatic compound.

DESCRIPTION OF THE INVENTION

As hereinbefore set forth, the present invention is directed to novel compositions of matter formed by reacting a polyhydroxydiphenyl compound, a borylating agent and an N,N-di-hydrocarbyl hydroxyamine. As will be hereinafter set forth, the exact structure of the reaction product will vary primarily depending upon the particular configuration of the polyhydroxyaromatic compound and also on the particular borylating agent and the particular hydroxyamine used as reactants. Accordingly, the reaction product is being claimed in this manner in the present application.

The polyhydroxy aromatic compound for use in preparing the novel composition of the present invention is selected from the group consisting of polyhydroxydiphenyl alkane, polyhydroxydiphenyl ether, polyhydroxydiphenyl sulfide, and polyhydroxydiphenyl amine. These compounds may be illustrated by the following formula:

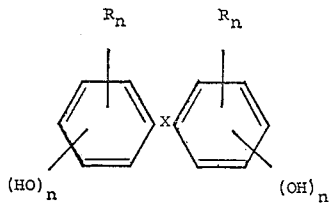

where X is alkylene of from one to 12 carbon atoms, oxygen, sulfur or imino, R is hydrogen or hydrocarbyl and $n$ is one or two.

Where X in the above formula is alkane, the alkylene moiety contains from one to 12 carbon atoms and may be in either straight chain or branched chain arrangement.

Illustrative compounds in this embodiment include 2,2'-dihydroxydiphenyl methane, 2,3,2',3' - tetrahydroxydiphenyl methane, 3,3'-dihydroxydiphenyl methane, 4,4'-dihydroxydiphenyl methane, 3,4,3',4'-tetrahydroxydiphenyl methane, etc. Where R in the above formula is hydrocarbyl, it is selected from alkyl of from one to 20 carbon atoms, cycloalkyl of from four to 10 carbon atoms, phenyl and lower alkyl substituted phenyl. Illustrative compounds in which R is alkyl include 2,2'-dihydroxy-5,5'-dimethyldiphenyl methane,
2,2'-dihydroxy-5,5'-diethyldiphenyl methane,
2,2'-dihydroxy-5,5'-di-isopropyldiphenyl methane,
2,2'-dihydroxy-5,5'-di-secbutyldiphenyl methane,
2,2'-dihydroxy-5,5'-di-secpentyldiphenyl methane,
2,2'-dihydroxy-5,5'-di-sechexyldiphenyl methane,
2,2'-dihydroxy-5,5'-di-secheptyldiphenyl methane,
2,2'-dihydroxy-5,5'-di-secoctyldiphenyl methane, etc.

corresponding 2,2'-dihydroxy-3,3'-dialkyldiphenyl methanes, corresponding 2,2'-dihydroxy-4,4'-dialkyldiphenyl methanes, etc. Where two alkyl substituents are attached on each nucleus, illustrative compounds include 2,2'-dihydroxy-3,3'-di-isopropyl-5,5'-dimethyldiphenyl methane,
2,2'-dihydroxy-3,3'-di-secbutyl-5,5'-dimethyldiphenyl methane,
2,2'-dihydroxy-3,3'-di-secpentyl-5,5'-dimethyldiphenyl methane,
2,2'-dihydroxy-3,3'-di-sechexyl-5,5'-dimethyldiphenyl methane,
2,2'-dihydroxy-3,3'-di-secheptyl-5,5'-dimethyldiphenyl methane,
2,2'-di-hydroxy-3,3'-di-secoctyl-5,5'-dimethyldiphenyl methane, etc., corresponding by substituted compounds in which the methyl groups are replaced by ethyl, propyl, butyl, pentyl, hexyl, etc., similarly substituted polyhydroxydiphenyl ethanes, polyhydroxydiphenyl propanes, polyhydroxydiphenyl butanes, polyhydroxydiphenyl pentanes, polyhydroxydiphenyl hexanes, etc., and similarly substituted compounds in which the alkyl groups are replaced by cycloalkyl or phenyl.

In another embodiment, the hydroxy groups are in the 3,3' positions or 4,4' positions. Illustrative compounds in this embodiment include 3,3'-dihydroxydiphenyl methane,
3,3'-dihydroxy-4,4'-dihydroxyhydrocarbyldiphenyl methane,
4,4'-dihydroxydiphenyl methane,
2,2'-dihydroxyhydrocarbyl-4,4'-dihydroxydiphenyl methane,
3,3'-dihydroxyhydrocarbyl-4,4'-dihydroxydiphenyl methane, etc.

in which the hydrocarbyl groups are selected from those specifically hereinbefore set forth, and similarly substituted polyhydroxydiphenyl alkanes in which the alkane moiety is selected from ethane, propane, butane, pentane, hexane, etc.

In another embodiment, the polyhydroxydiphenyl compound is a polyhydroxydiphenyl ether. Illustrative compounds in this embodiment include 2,2'-dihydroxydiphenyl ether, 3,3'-dihydroxydiphenyl ether, 4,4'-dihydroxydiphenyl ether, 2,3,2',3-tetrahydroxydiphenyl ether, 2,4,2',4' - tetrahydroxydiphenyl - ether, 2,5,2',5'-tetrahydroxydiphenyl ether, 2,6,2',6'-tetrahydroxydiphenyl ether, etc. Here again it is understood that each nucleus may also be substituted with a hydrocarbyl group or groups. Preferably these substituted compounds will correspond to these specifically hereinbefore set forth in connection with the description of the polyhydroxydiphenyl alkanes.

In still another embodiment, the polyhydroxydiphenyl compound is a polyhydroxydiphenyl sulfide. Illustrative compounds in this embodiment include 2,2'-dihydroxydiphenyl sulfide, 3,3'-dihydroxydiphenyl sulfide, 4,4'-dihydroxydiphenyl sulfide, 2,3,2',3'-tetrahydroxydiphenyl sulfide, 2,4,2',4'-tetrahydroxydiphenyl sulfide, 2,5,2',5'-tetrahydroxydiphenyl sulfide, 2,6,2',6'-tetrahydroxydiphenyl sulfide, etc. and those containing one or more hydrocarbyl groups on each nucleus.

In still another embodiment the polyhydroxydiphenyl compound is a polyhydroxydiphenyl amine. Illustrative compounds in this embodiment include 2,2'-dihydroxydiphenyl amine, 3,3'-dihydroxydiphenyl amine, 4,4'-dihydroxydiphenyl amine, 2,3,2',3' - tetrahydroxydiphenyl amine, 2,4,2',4'-tetrahydroxydiphenyl amine, 2,5,2',5'-tetrahydroxydiphenyl amine, 2,6,2',6' - tetrahydroxydiphenyl amine, etc. and these containing one or more hydrocarbyl groups on each nucleus.

As hereinbefore set forth the exact structure of the reaction product will depend in part on the proximity of the hydroxy groups to each other. For example, when the hydroxy groups are in adjacent positions or sufficiently close to each other, the reaction with the borylating agent will result in the formation of a cyclic borate. In the formation of the cyclic borate, two valences of the boron are satisfied and this leaves one unsatisfied valence which will react with the hydroxy amine. On the other hand, when the hydroxy groups of the polyhydroxyaromatic compound are positioned further apart, as, for example, in 4,4'-dihydroxydiphenyl alkane, one mole proportion of the borylating agent will react with each hydroxy group. The product undoubtedly will include a mixture of different compounds and perhaps a polymer formed by the reaction of one molecule of boric acid with the hydroxy groups of different polyhydroxyaromatic compounds.

From the above description it may be seen that any suitable polyhydroxydiphenyl compound may be used as a reactant in preparing the novel composition of the present invention. It is understood that the different polyhydroxy aromatic compounds will not necessarily react identically but all of them will react to form desired compositions of matter.

The novel reaction product includes the reaction with a borylating agent. Any suitable borylating agent may be used. A particularly preferred borylating agent is boric acid. Other borylating agents include trialkyl borates in which the alkyl groups preferably contain from 1 to 4 carbon atoms each. In the use of the latter type borylating agent, the reaction is effected by transesterification and, accordingly, there is no advantage to using trialkyl borates containing more than 4 carbon atoms in each alkyl group, although the higher boiling trialkyl borates may be used when satisfactory and advantages appear therefor. Still other borylating agents include boric anhydride, boric oxide, boric acid complex, alkyl boric acid, dialkyl boric acid, cycloalkyl boric acid, dicycloalkyl boric acid, aryl boric acid, diaryl boric acid, alkylboronic acid, arylboronic acid, alkylborinic acid, arylborinic acid, or substitution products of these with alkoxy, alkyl and/or halo groups.

The other reactant for use in preparing the novel reaction product of the present invention is an N,N-disubstituted hydroxyamine. In one embodiment this is an N,N-di-substituted alkanolamine. In a preferred embodiment the alkanol moiety contains from 2 to 6 carbon atoms, although it may contain up to 12 or more carbon atoms when desried. The substitutions on the nitrogen atom preferably are hydrocarbyl and thus are selected from alkyl, cycloalkyl and aryl. The alkyl substituents may contain from 1 to about 20 and preferably from 3 to 15 carbon atoms each. Illustrative N,N-dialkyl-ethanolamines include N,N-diisopropyl-ethanolamine, N,N-di-secbutyl-ethanolamine, N,N-di-sec-pentyl - ethanolamine, N,N-di-sechexyl-ethanolamine, N,N-di-secheptyl-ethanolamine, N,N-di-secoctyl-ethanolamine, N,N-di-secnonyl-ethanolamine, N,N-di-secdecyl-ethanolamine, N,N-di-secundecyl-ethanolamine, N,N-di-secdodecyl - ethanolamine, N,N-di-sectridecyl-ethanolamine, N,N - di - sectetradecyl-ethanolamine, N,N-di-secpentadecyl-ethanolamine, etc. A preferred N,N-dicycloalkyl-ethanolamine is N,N-dicyclohexyl-ethanolamine. Other N,N-dicycloalkyl-ethanolamines include N,N-dicyclobutyl-ethanolamine, N,N-dicyclopentyl-ethanolamine, N,N - dicycloheptyl-ethanolamine, N,N-dicyclooctyl-ethanolamine, N,N-dicyclononyl-ethanolamine, N,N-dicyclodecyl-ethanolamine, etc. Illustrative N,N-diaryl-ethanolamines include N,N-diphenyl-ethanolamine, N,N-ditolyl-ethanolamine, N,N - dixylyl-ethanolamine, etc. The above examples are of di-substituted ethanolamines, it being understood that the corresponding propanolamines, butanolamines, pentanolamines, hexanolamines, etc., may be used when desired.

In another embodiment the N,N-di-substituted hydroxyamine is a hydroxy aromatic amine. Illustrative compounds in this embodiment include N,N-dialkyl-hydroxy-anilino, N,N-dicycloalkyl-hydroxyaniline, N,N-diphenyl-hydroxyaniline and the nuclear substituted derivatives thereof. It is understood that the substitutions on the nitrogen atom will be selected from those hereinbefore set forth. In a preferred embodiment the nitrogen atom and hydroxyl groups are in para-position to each other but these may be in the ortho- or meta-positions to each other. In another embodiment the N,N-di-substituted hydroxyamine is an N,N-di-substituted hydroxy-cyclohexyl amine in which the hydroxy and amino groups are in position ortho-, meta- or para- to each other and in which the substitutions on the nitrogen atom are selected from those hereinbefore set forth.

The reaction of the polyhydroxyaromatic compound, borylating agent and N,N-di-substituted hydroxyamine is effected in any suitable manner. In one method the reactants in the desired proportions are mixed and the mixture is heated and refluxed to effect the desired reaction. In another method the polyhydroxyaromatic compound and borylating agent are first reacted and then the N,N-disubstituted hydroxyamine is reacted with the partial reaction products. In still another embodiment the borylating agent and N,N-di-substituted hydroxyamine are first reacted and then the partially reacted products are further reacted with the polyhydroxyaromatic compound.

Regardless of the particular method of reacting, the reaction is effected by heating and refluxing the mixture of reactants. In one embodiment the reaction is effected at a temperature within the range of from about 60° to about 100° C. when using boric acid. When chelate formation does not occur, the reaction may be effected at a temperature above about 100° C. and thus within the range of from about 100° to about 200° C. or more, in which reaction meta-borates are formed. Also, the higher temperature of from about 100° to about 200° C. is used when employing trialkyl borates in order to effect the transesterification reaction.

In one method the reactants are refluxed in the presence of a solvent. Any suitable solvent may be used and advantageously comprises an aromatic hydrocarbon solvent including benzene, toluene, xylene, ethylbenzene, cumene, etc. Other solvents include n-hexane, n-heptane, n-octane, chlorinated hydrocarbons, etc., or mixtures thereof. The use of a solvent is particularly preferred when boric acid is used as the borylating agent. When using a trialkyl borate as the borylating agent, the solvent may be omitted. While no catalyst normally is required, a catalyst may be used when employing the trialkyl borate. Any suitable catalyst may be employed including sodium hydrogen sulfate, potassium hydrogen sulfate, tin oxide, polyalkyl tin derivatives, alkoxy titanium derivatives, trialkyl or trialkoxy aluminum, toluene sulfonic acid, benzene sulfonic acid, various sulfonated ion exchange resins, solid phosphoric acid, polyphosphoric acid, sulfuric acid and in fact any suitable esterification or transesterification catalyst.

The temperature of the refluxing will depend upon the particular solvent employed. For example, with benzene as the solvent, the temperature will be of the order of 80° C. When using toluene, the temperature will be of the order of 110° C. When using xylene, the temperature will be of the order of 140° C.

The proportions of borylating agent, polyhydroxyaromatic compound and N,N-di-substituted hydroxyamine will vary depending upon the particular reactants employed. In general the proportion of borylating agent to polyhydroxyaromatic compound will be within a mole ratio of 0.5 to 4 and preferably from about 1 to about 3 mole proportions of borylating agent per one mole proportion of polyhydroxyaromatic compound. The N,N-di-substituted hydroxyamine generally will be used in equal mole proportions to the borylating agent but may vary from 0.5 to 3 mole proportions of the hydroxyamine per one mole proportion of borylating agent.

As hereinbefore set forth the reaction is readily effected by heating and refluxing the reactants, with or without solvent and/or catalyst as required. Refluxing is continued until the required amount of water when using boric acid or of alcohol when using trialkyl borate is collected. Following completion of the reaction the solvent and alcohol, if any, may be removed by vacuum distillation or in any other suitable manner. The reaction product generally is recovered as a solid and may be used as such when desired the reaction product may be retained in the solvent and used as such or the reaction product may be prepared as a solution in a different solvent and used in this manner.

From the above discussion it will be seen that the exact structure of the reaction product may vary and also that the reaction product may consist of a mixture of compounds. It is understood that the different reaction products meeting the requirements as hereinbefore set forth may be used for the purposes of the present invention but that the different additives are not necessarily equivalent in their effectiveness in the same or different substrates.

The novel compounds of the present invention possess varied utility. They are particularly advantageous for use as additives in organic substances subject to oxidative deterioration. These compounds also serve as weathering stabilizers to protect substrates which undergo ultraviolet light-induced oxidation. Also, they may serve as antimildew, fungicide, bactericide, etc., additives for organic substrates, especially fibers, cloth, paint, varnish, other coatings, fuels, etc., or as antistatic or antiblocking additives and as dye sites in plastics. The substrates normally subject to exposure to weather include plastics, resins, paints, varnishes, other coatings, fibers, textiles, etc.

Illustrative plastics which are stabilized by the novel compounds of the present invention include polyolefins and particularly polyethylene, polypropylene, polybutylene, mixed ethylene propylene polymers, mixed ethylene butylene polymers, mixed propylene butylene polymers, including the above copolymerized with straight chain or cyclic diene to give terpolymers which can be cured to rubbers, etc. The solid olefin polymers are used in many applications including electrical insulation, lightweight outdoor furniture, awnings, cover for greenhouses, fibers, etc. In many of these applications the solid olefin polymer is exposed to sunlight and air.

Another plastic being used commercially on a large scale and which may be stabilized in accordance with the present invention is polystyrene. The polystyrene type resins are particularly useful in the manufacture of molded or machined articles which find application in such goods as windows, optical goods, automobile panels, molded household articles, etc. One disadvantage of polystyrene is its tendency to deteriorate when exposed to direct sunlight and air for extended periods of time.

Another class of plastics available commercially and which may be stabilized in accordance with the present invention is broadly classed as vinyl resins and is derived from monomers such as vinyl chloride, vinyl acetate, vinylidine chloride, etc. Polyvinyl chloride plastics are available commercially on a large scale and undergo deterioration when exposed to sunlight. Other vinyl type resins include copolymers of vinyl chloride with acrylonitrile, methacrylonitrile, vinylidine chloride, alkyl acrylates, alkyl methacrylates, alkyl maleates, alkyl fumarates, polyvinyl butyral, etc., or mixtures thereof. Still other plastics which may be stabilized in the present invention are polyphenyl ethers ABS (acrylonitrile-butadiene-styrene), etc.

Other plastics being used commercially on a large scale and which may be stabilized in accordance with the present invention are in the textile class and include nylon (polyamide), Perlon L or 6-nylon (polyamide), Dacron (terephthalic acid and ethylene glycol), Orlon (polyacrylonitrile), Dynel (copolymer of acrylonitrile and vinyl chloride), Acrilan (polyacrylonitrile modified with vinyl acetate), Saran (copolymer of vinylidine chloride and vinyl chloride), rayon, etc. Here again, deterioration occurs due to ultraviolet light and oxidation. In addition, the additives of the present invention may serve as dye sites in plastics. This is especially desirable in plastics used for textiles as, for example, use of plastics for carpeting, fabrics, etc. Furthermore, the additives of the present invention also may inhibit discoloration of the plastic.

Still other plastics which may be stabilized in the present invention are prepared from other monomers and are available commercially. Illustrative examples include polyurethanes, both the urethane foams and the rigid resins, epoxy resins, polycarbonates, etc. Still other illustrative examples include phenol-formaldehyde resins, urea-formaldehyde resins, melamine-formaldehyde resins, acryloid plastics which are derived from methyl, ethyl and higher alkyl acrylates and methacrylates as monomers used in the polymerization. Other polymers include polyacetals, especially polyformaldehydes such as "Delrin" and "Celcon." Still other substrates include vinyl, acrylic, nitrocellulose based coatings; especially cellulose acetate, cellulose acetate butyrate, ethyl cellulose, etc. Still other substrates are polyesters, including linear or cross-linked, reinforced polyesters, laminate polyesters, etc., various latexes, lacquers, alkyds, varnishes, polishes, stains, pigments, dyes, textile finishing formulations, etc.

It is understood that the plastic may be fabricated into any desired finished product including moldings, castings, fibers, films, sheets, rods, tubing or other shapes.

Rubber is composed of polymers of conjugated 1,3-dienes, either as polymers thereof or as copolymers thereof with other polymerizable compounds, and the rubbers, both natural and synthetic, are included as solid polymers in the present specification and claims for stabilization in the present invention. Synthetic rubbers include SBR rubber (copolymer of butadiene and styrene), Buna N (copolymer of butadiene and acrylonitrile), butyl rubber (copolymer of butadiene and isobutylene), neoprene rubber (chloroprene polymer), Thiokol rubber (polysulfide), silicone rubber, etc. The natural rubbers include hevea rubber, cautchouc, balata, gutta percha, etc. It is well known that rubber undergoes deterioration due to oxygen and, when exposed to direct sunlight for extended periods of time, also undergoes deterioration from this source.

The above are illustrative examples of various plastics and resins which are improved by the additives of the present invention. As hereinbefore set forth, still other substrates include paints, varnishes, drying oils, pigments, rust preventative coatings, wax coatings, protective coatings, etc. It is understood that the compounds of the present invention may be used in any coating which is subject to exposure to ultraviolet light, oxidation, heat, etc. While the compounds are especially useful in materials subject to such exposure, it is understood that the compounds of the present invention also may be used advantageously in other coatings, plastics, resins, paints, etc., which normally are not exposed outdoors.

The compounds of the present invention also are of utility as additives in other organic substrates incuding, for example, hydrocarbon distillates. Illustrative hydrocarbon distillates include gasoline, naphtha, kerosene, jet fuel, solvents, fuel oil, burner oil, range oil, diesel oil, marine oil, turbine oil, cutting oil, rolling oil, soluble oil, drawing oil, slushing oil, lubricating oil, fingerprint remover, wax, fat, grease, etc. In the oils, the compounds of the present invention serve to inhibit oxidative deterioration, thermal deterioration, etc., thereby retarding and/or preventing sediment formation, preventing and/or retarding discoloration, rust or corrosion inhibitor, detergent, dispersing agent, etc. In gasoline, the additive improves the combustion characteristics of the gasoline.

In many applications it is advantageous to utilize the compounds of the present invention in conjunction with other additives. For example, particularly improved results are obtained in the stabilization of plastics, apparently due to a synergistic effect, when the compound of the present invention is used in admixture with a phenolic antioxidant including particularly 2,6-ditertiarybutyl-4-methylphenol. Other inhibitors which may be used generally will be of the phenolic or amine type and include phenyl-alpha-naphthylamine, phenyl-beta-naphthylamine, phenothiazine, Nonox WSP, Nonox C1, dialkylated phenols, trialkylated phenols including 2,4-dimethyl-6-tertiarybutylphenol), etc., Santonox R, Santowhite, alkyl-alkoxyphenols, 2246 (2,2'-methylene-bis-(4-methyl-6-tert-butylphenol) and 425 (2,2' - methylene - bis - (4-ethyl-6-tert-butylphenol), diphenyl-p-phenylene-diamine, 1,1,3-tris-(2-methyl-4-hydroxy-5-t-butylphenyl)-butane, 703 (2,6 - di-tert-butyl-alpha-dimethylamino-p-cresol), 4,4' - bis - (2-methyl-6-tert-butylphenol); 4,4' - thio-bis-(6-tert-butyl-o-cresol); 4,4'-bis-(2,6-di-tert-butylphenol); 4,4'-methylene-bis-(2,6-di-tert-butylphenol); Salol (salicyclic acid esters), p-octylphenylsalicylate, various phosgene alkylated phenol reaction products, etc. Other ultraviolet light stabilizers include nickel-bis-dithiocarbamates and especially nickel-bis-dibutyldithiocarbamate, nickel-bis-dihydroxypolyalkylphenol sulfides, especially [2,2'-thiobis-(4-t-octylphenolato)] - n - butylamine nickel (II), dilauryl beta-mercaptodipropionate, dihydroxytetralkyl sulfides, dihydroxytetralkyl methanes, various trithiophosphites as trilaurylthiophosphate, dialkylphosphites, trialkylphosphites, high molecular weight nitriles, various Mannich bases, various N-hydroxyphenylbenzotriazoles such as 2-(2'-hydroxy-5'-octylphenyl)-benzotriazole, 2-(2'-hydroxy - 5' - dodecylphenyl)-benzotriazole, 2 - (2'-hydroxy-5'-octoxyphenyl)-benzotriazole, 2-(2'-hydroxy-5'-dodecoxyphenyl) - benzotriazole. Tinuvin 326, etc., in general, any alkyl or alkoxyphenyl substituted benzotriazole, etc. The additional inhibitor may be used in a concentration of from about 1% to about 200% by weight and generally from about 10% to about 75% by weight of the compound of the present invention. Generally, the additional inhibitor will be used in a concentration within the range of from about 0.001% to about 3% and more particularly from about 0.01% to about 2% by weight of the substrate.

The additive of the present invention will be used in a stabilizing concentration which will depend upon the particular substrate. The additive may be used in a concentration as low as 0.0001% to as high as about 25% but generally will be used in a concentration of from about 0.01% to about 5% by weight of the substrate. When used in hydrocarbon distillate and particularly gasoline, the additive generally is used in a concentration of from about 0.0001% to about 0.5%. The additive is incorporated in the substrate in any suitable manner. For example, when it is incorporated into a plastic, resin or the like, it may be added to the hot melt with stirring, generally in a Banbury mixer, extruder or other device. When it is added to a liquid, it is incorporated into the liquid with intimate stirring. When it is added to a multicomponent mixture as, for example, grease, it may be added to one of the components and, in this manner, incorporated into the final mix or it may be added directly into the final mix.

The additive of the present invention may be utilized as such or prepared as a solution in a suitable solvent including alcohols and particularly methanol, ethanol, propanol, butanol, etc., hydrocarbons and particularly benzene, toluene, xylene, cumene, Decalin, etc.

The following examples are introduced to illustrate further the novelty and utility of the present invention but not with the intention of unduly limiting the same.

Example I

The compound of this example was prepared by the reaction of equal mole proportions of 2,2'-dihydroxy-5,5'-di-sec-octyldiphenyl sulfide, boric acid and N,N-dicyclohexyl ethanolamine. The reaction was effected by commingling 44.2 g. (0.1 mole) of the dihydroxy-di-sec-octyldiphenyl sulfide with 200 g. of toluene, then adding 6.18 g. (0.1 mole) of boric acid, and subjecting the mixture to refluxing for about 4 hours. Following this, 22.5 g. (0.1 mole) of N,N'-dicyclohexyl ethanolamine dissolved in 100 g. of toluene was added, and the mixture was subjected to further heating and refluxing, with the water formed during the reaction being continuously removed overhead. Following completion of the reaction, the toluene solvent was removed by distillation under vacuum, and the reaction product was recovered as a light amber glossy solid. Analysis showed a boron content of 1.70% by weight which corresponds to the theoretical boron content of 1.74% by weight for the reaction product which is believed to be of the following structure:

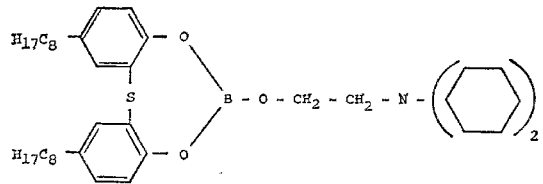

While applicant believes the reaction product to be of the structure set forth above, it is understood that applicant does not wish to be liited to this specific compound. However, analysis shows that the boron content is close to the theoretical for the above compound and thus appears to confirm the above structure.

Example II

The compound of this example was prepared by the reaction of equal mole proportions of 2,2'-dihydroxy-3,3'-di-sec-butyl-5,5'-dimethyldiphenyl methane, boric acid and N,N-dicyclohexyl ethanolamine. The reaction was effected by refluxing a mixture of 170.25 g. (0.5 mole) of 2,2'-dihydroxy-3,3'-di-sec-butyl-5,5'-dimethyldiphenyl methane, 34 g. (0.5 mole plus 10%) of boric acid, 112.5 g. (0.5 mole) of N,N-dicyclohexyl ethanolamine and 200 g. of toluene. A total of 26.2 cc. of water was collected. After completion of the reaction, the solvent was removed by distillation at 110° C. under water pump vacuum. The product was recovered as a glassy dark brown resinous powder. Analysis showed 2.26% nitrogen (theoretical is 2.45%) and 2.06% boron (theoretical is 1.89%). These theoretical concentrations are for a reaction product which is believed to be similar to that described in Example I except that the sulfur is replaced by a $CH_2$ group.

Example III

The reaction product of this example is prepared by heating and refluxing one mole proportion of 4,4'-dihydroxydiphenyl ether, two mole proportions of boric acid and four mole proportions of N,N-di-isopropyl propanolamine in the presence of toluene solvent. The heating and refluxing is continued at a temperature of about 110° C., during which time water formed in the reaction is distilled overhead and collected. Upon completion of the reaction, the reaction mixture is allowed to cool and the product is recovered in admixture in the solvent.

Because the hydroxy groups are in a position distant from each other, formation of a cyclic product does not occur. It is believed that the reaction product will include the following configuration:

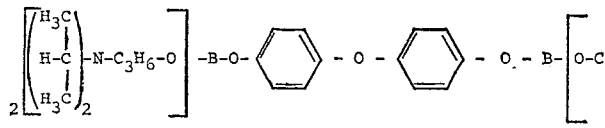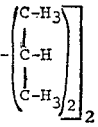

It will be noted that one valence of each of the boron is satisfied by one hydroxyl group of the dihydroxydiphenyl ether, with the other two valences of the boron being satisfied by two molecules of the propanolamines.

Example IV

The reaction product of this example is prepared by first reacting 4,4'-dihydroxydiphenyl amine with nonyl boronic acid and then reacting with N,N-dicyclohexyl-p-hydroxyaniline. The reaction is effected in the presence of toluene solvent by first heating and refluxing one mole proportion of 4,4'-dihydroxydiphenyl amine and two mole proportions of nonyl boronic acid for a period of 6 hours, and then adding one mole proportion of N,N-dicyclohexyl-p-hydroxyaniline and continuing the heating and refluxing for another 4 hours. Following completion of the reaction, the reaction mixture is allowed to cool and the toluene solvent is removed by distillation under vacuum.

Example V

The reaction product of this example is prepared by the transesterification reaction in which tributyl borate is used as the borylating agent. The reaction is effected by heating and refluxing equal mole proportions of 4,4'-dihydroxydiphenyl propane, tributyl borate and N,N-diphenylethanolamine in xylene solvent. The refluxing is effected at a temperature of about 140° C. and is continued until the required amount of butanol is collected, the butanol resulting from the transesterification reaction. Following completion of the reaction, the reaction mixture is worked up in and substantially the same manner as hereinbefore set forth and the product is recovered in solution in the xylene solvent used in the reaction.

Example VI

As hereinbefore set forth the compound of the present invention is useful as an antioxidant in plastic. The plastic is solid polypropylene which, without inhibitor, is stated to have properties substantially as follows:

TABLE I

| | |
|---|---|
| Specific gravity | 0.910–0.920 |
| Refractive index, $n_D^{25}$ | 1.510 |
| Heat distortion temperature: | |
| At 66 p.s.i. load, ° C. | 116 |
| At 264 p.s.i. load, ° C. | 66 |
| Tensile yield strength, p.s.i. (ASTM D-638-58T) (0.2″ per min.) | 4700 |
| Total elongation, percent | 300–400 |
| Stiffness flexural (ASTM D747-50) $10^5$ p.s.i. | 1.8 |
| Shore hardness (ASTM D676-55T) | 74D |

The additive when employed is incorporated in the sample of the polypropylene by milling. Sample of the polypropylene without additive and sample of the polypropylene with additive may be evaluated in a method similar to that described by Hawkins, Hansen, Matreyek and Winslow in Rubber Chemistry and Technology, October–November 1959, pages 1164–1170, except that an electrically heated aluminum block rather than an oven is used to maintain the desired temperature. The oxygen absorption of the sample is determined manometrically rather than volumetrically. In this method samples of the polypropylene, weighing about 0.5 gram each, are placed in separate 8 mm. glass tubes and the tubes then are inserted into horizontal rows of openings located concentrically around the heater. The temperature is maintained at about 140° C. The glass tubing also is packed with glass wool and molecular sieves to absorb the gases. Each of the glass tubes is connected to an individual manometer containing mercury, and the differential pressure is periodically determined. The Induction Period is taken as the number of hours required to reach a pressure differential of 20 cm. Hg.

When evaluated in the above manner, the control sample of the polypropylene without additive had an Induction Period of less than 4¼ hours. In contrast, another sample of the polypropylene containing 1% by weight of the reaction product of 2,2'-dihydroxy-5,5'-di-sec-octyldiphenyl sulfide, boric acid and N,N-dicyclohexyl ethanolamine, prepared as described in Example I, and 0.15% by weight of 2,6-ditertbutyl-4-methylphenol, when evaluated, in the same manner has an Induction Period of over 1000 hours. It is believed that the use of the reaction product in admixture with the 2,6-ditertbutyl-4-methyl-phenol results in a synergistic effect and increases the Induction Period even more than obtained when using the reaction product alone. The 2,6-ditertbutyl-4-methylphenol, when used alone and evaluated in the above manner, was of substantially no effect in increasing the Induction Period of the polypropylene.

Example VII

The plastic of this example is solid polyethylene of the high density type. An inhibited product of this polyethylene is marketed commercially under the trade name of "Fortiflex." Samples of the polyethylene are pressed into plaques and evaluated in the Fadometer. The plaques are inserted into plastic holders affixed onto a rotating drum and exposed to carbon arc rays at about 52° C. in the Fadometer. The samples are examined periodically by infrared analysis to determine the carbonyl band at 1715 c.$^{-1}$, which is reported as the "carbonyl number." The higher intensity of the carbonyl band indicates a higher carbonyl concentration (expressed as carbonyl number) and, accordingly, increased deterioration.

The additive of this example is the reaction product of 2,2' - dihydroxy - 3,3' - di-sec-butyl-5,5'-dimethyldiphenyl methane, boric acid and N,N-dicyclohexyl ethanolamine, prepared as described in Example II, and is incorporated in a concentration of 1% by weight in otherwise uninhibited samples of the polyethylene prior to pressing into sheets. This serves to stabilize the polyethylene and to considerably increase the time before a carbonyl number of 1000 is reached.

Example VIII

The plastic of this example is polystyrene. During milling thereof, 1% by weight of the reaction product prepared as described in Example III is incorporated in the polystyrene. This serves to inhibit deterioration of the polystyrene upon exposure to weathering.

Example IX

This sample describes the use of the additive of the present invention in grease. In this example the reaction product prepared as described in Example IV is incorporated in a concentration of 0.5% by weight in a commercial Mid-Continent lubricating oil having an S.A.E. viscosity of 20. Approximately 92% of the lubricating oil then is mixed with approximately 8% by weight of lithium stearate. The mixture is heated to about 230° C., with constant agitation. Subsequently the grease is cooled, while agitating, to approximately 120° C., and then the grease is further cooled slowly to room temperature.

The stability of the grease is tested in accordance with ASTM D-942 method, in which method a sample of the grease is placed in a bomb and maintained at a temperature of 121° C. Oxygen is charged to the bomb, and the time required for a drop of five pounds pressure is taken as the Induction Period. A sample of the grease without additive will reach the Induction Period within 4 hours. A sample of the grease containing 0.5% by weight of the reaction product of the present invention will not reach the Induction Period until more than 100 hours when evaluated in the above manner.

Example X

This examples describes the use of the additive of the present invention in synthetic lubricating oil. The synthetic lubricating oil is dioctyl sebacate and is marketed commercially under the trade name of "Plexol." The additive is the reaction product prepared as described in Example V and is incorporated in a concentration of 1% by weight in the synthetic lubricating oil with intimate mixing. This serves to prevent oxidative deterioration of the lubricating oil and to preserve the lubricity properties of the oil.

I claim as my invention:

1. The product formed by reacting (1) a polyhydroxy aromatic compound selected from the group consisting of (a) polyhydroxydiphenyl alkane containing from one to 12 carbon atoms in said alkane, (b) polyhydroxydiphenyl ether, (c) polyhydroxydiphenyl sulfide and (d) polyhydroxydiphenyl amine, (2) a borylating agent, and (3) N,N-dihydrocarbyl-hydroxyamine in which each hydrocarbyl is selected from the group consisting of alkyl of from one to 20 carbon atoms, cycloalkyl of from 4 to 10 carbon atoms, phenyl and lower alkyl substituted phenyl, at a temperature of from about 60° to about 200° C.

2. The product of claim 1 in which said polyhydroxy diphenyl compound is of the following formula:

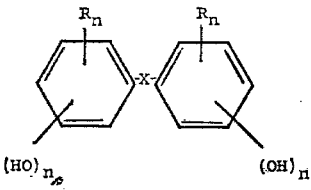

where X is alkylene of from one to 12 carbon atoms, oxygen, sulfur or imino, R is hydrogen or alkyl, and $n$ is one or two.

3. The product of claim 1 in which said borylating agent is boric acid.

4. The product of claim 1 in which said N,N-dihydrocarbyl-hydroxyamine is N,N - dicyclohexyl-ethanolamine.

5. The product of claim 1 in which said dihydrocarbyl hydroxy amine is N,N-dialkyl-ethanolamine having from one to 20 carbon atoms in each alkyl.

References Cited

UNITED STATES PATENTS

| | | | |
|---|---|---|---|
| 3,102,873 | 9/1963 | Lee | 260—462 R X |
| 3,257,442 | 6/1966 | Woods et al. | 260—462 R |
| 2,795,548 | 6/1957 | Thomas et al. | 260—462 R |
| 3,445,498 | 5/1969 | Cyba | 260—462 R |

HOWARD T. MARS, Primary Examiner

L. DE CRESCENTE, Assistant Examiner